Figure 1:
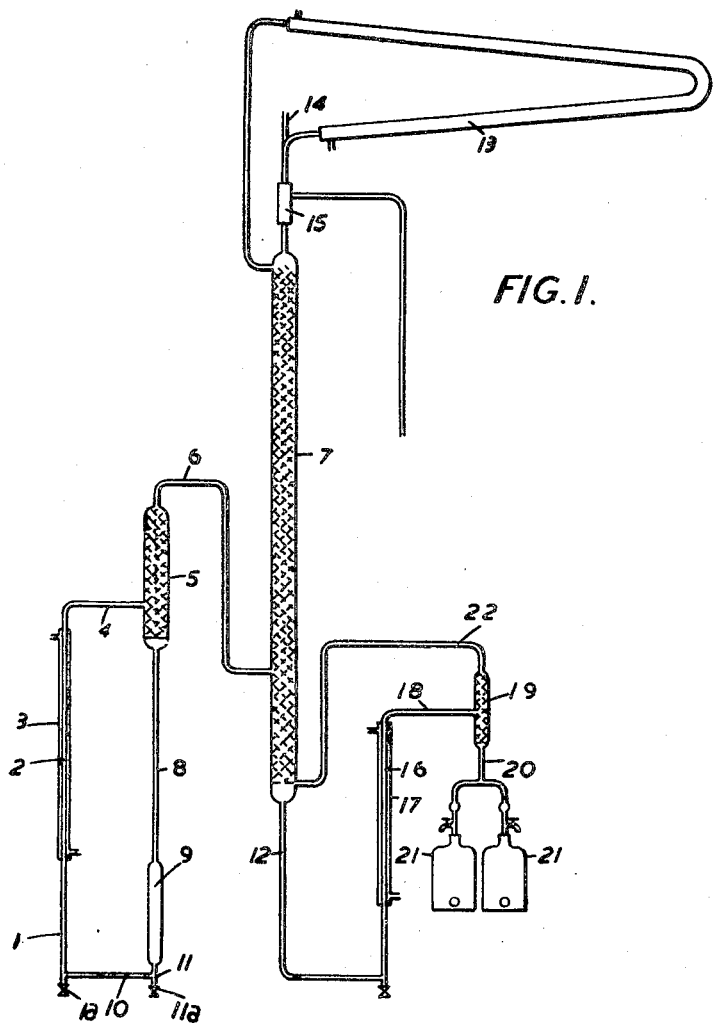

William Stanley Wood, William Raymond Holmes and Henry Whittaker
INVENTORS

Aug. 29, 1950 W. S. WOOD ET AL 2,520,870
PURIFICATION OF HYDROGEN PEROXIDE
Filed April 2, 1946 2 Sheets-Sheet 2

FIG.2.

William Stanley Wood, William Raymond Holme
and Henry Whittaker
INVENTORS
By George H. Corey
Their Attorney Patented Aug. 29, 1950

2,520,870

UNITED STATES PATENT OFFICE 2,520,870

PURIFICATION OF HYDROGEN PEROXIDE

William Stanley Wood, Harpenden, William Raymond Holmes, Luton, and Henry Whittaker, Woolwich, London, England; said Wood and said Holmes assignors to Laporte Chemicals Limited, a British company Application April 2, 1946, Serial No. 659,028
In Great Britain April 17, 1945

9 Claims. (Cl. 202—57)

This invention relates to the manufacture of hydrogen peroxide of high concentration (which expression as used herein means hydrogen peroxide of at least 75% weight/weight concentration).

Pure and highly concentrated hydrogen peroxide solutions have been prepared on a small scale by vaporizing as a film, and passing the vapour into a separator to remove the impurities, and condensing the pure vapour (cf. J. A. C. S., 1920, page 2549). This peroxide was of the highest purity and of a concentration approaching 100%. A number of processes for the concentration of hydrogen peroxide on a commercial scale have been suggested but these have all been concerned with the conversion to concentrations of about 35% weight/weight from original solutions of about 3% concentration. It has not hitherto been possible to convert to concentrations approaching 100% on a large scale by distillation owing to the large losses that would be sustained and the unstable nature of the final product, due to the accumulated impurities.

It has now been found according to this invention that hydrogen peroxide up to 98% concentration and of the highest purity and stability can be made on a large scale by a continuous distillation process and with a high efficiency.

According to the present invention a process is provided for the manufacture of hydrogen peroxide of high concentration (as hereinbefore defined) which comprises distilling under reduced pressure the aqueous solution of hydrogen peroxide to be concentrated, in a distillation vessel, preferably in a climbing film evaporator, the said solution being introduced at the base thereof, passing the evolved vapours into a separator, withdrawing hydrogen peroxide vapour and water vapour as the overhead product from the separator and removing liquid hydrogen peroxide and impurities as the bottom product from the separator, passing the overhead product from the separator to a fractionating column where it is subjected to fractional distillation under reduced pressure, whilst cooling the top of the column, withdrawing concentrated liquid hydrogen peroxide as the bottom product from the fractionating column and removing water vapour as the overhead product.

If it is desired to obtain the highest possible concentration of hydrogen peroxide the liquid leaving at the bottom of the fractionating column is concentrated by a second evaporation, preferably in a second climbing film evaporator, and the products of vaporization separated in a second separator, the vapour passing overhead back to the bottom of the fractionating column and the concentrated liquid hydrogen peroxide being collected in a receiver. Alternatively, the vapour passing overhead from the second separator may be passed to a second fractionating column from which the distillate passes to the first fractionating column and the concentrated liquid hydrogen peroxide to a receiver. However, when making hydrogen peroxide of a concentration greater than 90% it is necessary to work at absolute pressures below 2" of mercury at the point where 90% hydrogen peroxide is produced to avoid fire and explosion risks.

In order to obtain the highest degree of purity the pH value of the aqueous solution of hydrogen peroxide fed to the plant is adjusted between pH 3 and pH 5.5 in the presence of a buffering agent with or without the usual stabilizers so that a metal vaporizer, e. g. of aluminium, can be used and so as to ensure removal of anions. As the pH of a concentrated hydrogen peroxide solution is difficult to determine it is preferable to specify this by a titration figure. Preferably this is less than 1.5 milliequivalents to Congo red as indicator. For neutralization it has been found that the preferred alkali is ammonium hydroxide.

Preferably the bottom product from the separator connected to the first climbing film evaporator is continuously returned to the inlet of the evaporator and is thus re-cycled. This re-cycling has the effect of producing a vapour containing a concentration of hydrogen peroxide which is the same as that of the feed. The process may be initiated either by introducing into the first climbing film evaporator a liquid containing at least 75% weight/weight of hydrogen peroxide or by introducing a more dilute hydrogen peroxide and running the climbing film evaporator until the concentration of hydrogen peroxide has built up with re-cycling of the bottom product. However, impurities gradually build up in the solution and from time to time the solution is wholly or partly run off instead of being re-cycled. If desired, the solution can be collected from the separators and steam distilled to recover the hydrogen peroxide or utilised in any other manner.

The invention will now be further described with reference to the accompanying drawings, in which:

Fig. 1 shows diagrammatically an apparatus suitable for carrying out the process of the invention, and Fig. 2 shows a modification of the apparatus of Fig. 1.

Referring to Fig. 1 of the drawings, the hydrogen peroxide solution to be concentrated and purified is introduced through tube 1 controlled by valve 1a into the base of a climbing film evaporator 2 surrounded by a heating jacket 3. The vaporization product passes via tube 4 into a separator 5 whence the hydrogen peroxide vapour in admixture with water vapour and substantially free from the relatively non-volatile impurities passes via tube 6 into a fractionating column 7. Liquid hydrogen peroxide and the impurities pass from the separator 5 down a tube 8 and re-enter the evaportor 2 via reservoir 9 and tubes 10 and 1, thus recovering the liquid from the separator. The impurities in the hydrogen peroxide build up in the liquid circulating round through the tubes and the evaporator and from time to time all or part of this liquor is discharged from the circuit by a run-off 11 controlled by valve 11a. The purified hydrogen peroxide vapour entering the fractionating column is fractionated in known manner and concentrated hydrogen peroxide of high purity leaves the bottom of the fractionating column by tube 12. The top of the column is connected to a condenser 13 and a vacuum pump (not shown) is connected to the tube 14 so that the whole of the apparatus is under vacuum. The top of the fractionating column is provided with a water cooled coil 15 or a water spray in known manner (cf. German Specification No. 649,269) to regulate the concentration of the hydrogen peroxide leaving the bottom of the column. If the hydrogen peroxide is not required to be of the highest strength it can be run off from the bottom of the column. If, however, the purified hydrogen peroxide is to be raised to the highest concentration it runs from the bottom of the column to a second climbing film evaporator 16 provided with a heating jacket 17. The hydrogen peroxide vapour from this evaporator flows through tube 18 into a second separator 19. The pure and highly concentrated hydrogen peroxide liquid leaves the separator 19 by a tube 20 and can be collected in receivers 21. The hydrogen peroxide vapour from the separator 19 leaves by a pipe 22 at the top of the separator and enters the column 7 at the bottom to be refractionated.

Referring to Fig. 2 of the drawings, it will be seen that the apparatus is modified in that the overhead vapour from the separator 19 passes through a pipe 23 to a second fractionating column 24 having means 25 for supplying reflux. The distillate from the column is returned by pipe 26 to the column 7 and the liquid residue passes by tube 28 to the receivers 21. The liquid residue from the separator 19 passes down the tube 27 and may be drawn off through valve 27a or recycled via the pipe 29 to the second evaporator 16.

It will be seen, therefore, that the process of the present invention works with minimum loss as the products are recirculated. The only loss (apart from the slight decomposition of hydrogen peroxide) is with the periodical discharge of impurities from the first separator.

The following examples, in which the apparatus referred to above was used, illustrate how the process of the invention may be carried into effect.

1. In this example the apparatus of Fig. 1 was used. The hydrogen peroxide solution introduced into the base of the first evaporator contained 28% weight/weight of $H_2O_2$. A vapour containing 27.5% weight/weight of $H_2O_2$ passed to the fractionating column, while the liquid recirculated to the evaporator contained 73% weight/weight of $H_2O_2$.

The condensing system at the top of the fractionating column was adjusted to give a hydrogen peroxide containing 73% weight/weight of $H_2O_2$ leaving the column. This was passed to the second evaporizer and resulted in a purified hydrogen peroxide containing 89.4% $H_2O_2$ being collected. The vapour returning to the column from the second separator contained 58% weight/weight $H_2O_2$. The total oxygen efficiency of the process was 98.8%. Thus, 1.2% was lost by decomposition.

The percentage removal of the impurities from the hydrogen peroxide was as follows:

| $SO_4$ | $NO_3$ | $P_2O_5$ | $NH_4$ |
|---|---|---|---|
| 99.0% | 97.4% | 97.5% | 96.0% | the impurities in the feed and finished product both being calculated to the same hydrogen peroxide concentration. The above figures are based on the average analysis of the product for a run extending over 40 hours when the impurities in the separator had concentrated to 100 times that of the original feed solution.

2. In this example the apparatus of Fig. 2 was used. The hydrogen peroxide introduced into the base of the first evaporator contained 28% weight/weight of hydrogen peroxide. A vapour containing 27.4% weight/weight was passed to the first fractionating column, while the liquid recirculated to the evaporator contained 73% weight/weight of hydrogen peroxide.

The condensing system at the top of the first fractionating column was adjusted to give a hydrogen peroxide containing 73% weight/weight of hydrogen peroxide leaving the column. This was passed to the second evaporator and gave a vapour containing 72.5% weight/weight of hydrogen peroxide the liquor passing back containing 90% weight/weight of hydrogen peroxide. The condensing system at the top of the second fractionating column was adjusted to give a hydrogen peroxide containing 89% weight/weight of hydrogen peroxide. The total oxygen efficiency was 98.9%. Thus, 1.1% was lost by decomposition.

The percentage removal of the impurities from the hydrogen peroxide was as follows:

| $SO_4$ | $NO_3$ | $P_2O_5$ | $NH_4$ |
|---|---|---|---|
| 99.9% | 97.1% | 99.8% | 99.2% |

In this case the analysis of the purified concentrated hydrogen peroxide was as follows, the impurities being given in gm./litre:

| $SO_4$ | $NO_3$ | $P_2O_5$ | $NH_4$ |
|---|---|---|---|
| <0.003 | 0.008 | 0.001 | 0.007 |

The above figures are based on the average analysis of the products for a run extending over 90 hours when the impurities in the separator had concentrated to 110 times that of the original feed solution.

The present invention thus makes possible the production of hydrogen peroxide solutions up to the highest concentrations and at the same time effects an almost complete removal of the impurities from such solutions.

We claim:

1. The process of purifying and recovering hydrogen peroxide of high concentration from a solution consisting essentially of aqueous hydrogen peroxide and containing relatively non-volatile impurities which comprises adjusting the pH of an aqueous solution of hydrogen peroxide containing relatively non-volatile impurities to a value of between 3 and 5.5, subjecting said solution to distillation under reduced pressure and at a temperature insuring partial vaporization of the solution, passing the evolved vapours and unvaporized liquid to a separator, withdrawing a mixture of water vapours and hydrogen peroxide vapours as the overhead product from the separator and removing liquid hydrogen peroxide and impurities as the bottom product from the separator, subjecting the overhead product from the separator to fractional distillation in a fractionating column under reduced pressure, while cooling the top of the column, withdrawing concentrated liquid hydrogen peroxide as the bottom product from the fractionating column and removing water vapour as the overhead product.

2. The process of purifying and recovering hydrogen peroxide of high concentration from a solution consisting essentially of aqueous hydrogen peroxide and containing relatively non-volatile impurities which comprises adjusting the pH of an aqueous solution of hydrogen peroxide containing relatively non-volatile impurities to a value of between 3 and 5.5, subjecting said solution to distillation under reduced pressure and at a temperature insuring partial vaporization of the solution, passing the evolved vapours and unvaporized liquid to a separator, withdrawing a mixture of water vapours and hydrogen peroxide vapours as the overhead product from the separator and removing liquid hydrogen peroxide and impurities as the bottom product from the separator, subjecting the overhead product from the separator to fractional distillation in a fractionating column under reduced pressure, while cooling the top of the column, withdrawing concentrated liquid hydrogen peroxide as the bottom product from the fractionating column, removing water vapour as the overhead product, subjecting said bottom product to a second evaporation, thereafter separating the vaporization products of said second evaporation into a more concentrated liquid hydrogen peroxide bottom product and an overhead vapour fraction, and returning said overhead fraction to a previous stage of the process.

3. The process of purifying and recovering hydrogen peroxide of high concentration from a solution consisting essentially of aqueous hydrogen peroxide and containing relatively non-volatile impurities which comprises adjusting the pH of an aqueous solution of hydrogen peroxide containing relatively non-volatile impurities to a value of between 3 and 5.5, subjecting said solution to distillation in a climbing film evaporator under reduced pressure and at a temperature insuring partial vaporization of the solution, passing the evolved vapours and unvaporized liquid to a separator, withdrawing a mixture of water vapours and hydrogen peroxide vapours as the overhead product from the separator and removing liquid hydrogen peroxide and impurities as the bottom product from the separator, subjecting the overhead product from the separator to fractional distillation in a fractionating column under reduced pressure, while cooling the top of the column, withdrawing concentrated liquid hydrogen peroxide as the bottom product from the fractionating column, removing water vapour as the overhead product, subjecting said bottom product to a second evaporation, passing the vaporization products of said second evaporation to a second separator, passing the overhead vapour from the separator to the bottom of said fractionating column and removing concentrated liquid hydrogen peroxide as a bottom product from said second separator.

4. The process of purifying and recovering hydrogen peroxide of high concentration from a solution consisting essentially of aqueous hydrogen peroxide and containing relatively non-volatile impurities which comprises adjusting the pH of an aqueous solution of hydrogen peroxide containing relatively non-volatile impurities to a value of between 3 and 5.5, subjecting said solution to distillation in a climbing film evaporator under reduced pressure and at a temperature insuring partial vaporization of the solution, passing the evolved vapours and unvaporized liquid to a separator, withdrawing a mixture of water vapours and hydrogen peroxide vapours as the overhead product from the separator and removing liquid hydrogen peroxide and impurities as the bottom product from the separator, subjecting said overhead product from the separator to fractional distillation in a fractionating column under reduced pressure, while cooling the top of the column, withdrawing concentrated liquid hydrogen peroxide as the bottom product from the fractionating column, removing water vapour as the overhead product, subjecting said bottom product to a second evaporation, passing the vaporization products of said second evaporation to a second separator, passing the vapour from the second separator to a second fractionating column, passing the overhead fraction from said second fractionating column to said first fractionating column and removing concentrated liquid hydrogen peroxide as the bottom product from said second fractionating column.

5. The process of purifying and recovering hydrogen peroxide of high concentration from a solution consisting essentially of aqueous hydrogen peroxide and containing relatively non-volatile impurities which comprises subjecting a dilute aqueous solution of hydrogen peroxide containing relatively non-volatile impurities and having a pH value of between 3 and 5.5 to distillation in a climbing film evaporator under reduced pressure and at a temperature insuring partial evaporation of the solution being fed to the evaporator, passing the evolved vapours and unvaporized liquid into a separator, withdrawing a mixture of water vapours and hydrogen peroxide vapours as the overhead product from the separator and removing liquid hydrogen peroxide and impurities as the bottom product from the separator, subjecting the hydrogen peroxide vapour from the separator to fractional distillation in a fractionating column under reduced pressure, while cooling the top of the column, withdrawing concentrated liquid hydrogen peroxide as the bottom product from the fractionating column and removing water vapour as the overhead product, subjecting said bottom product to a second evaporation, separating the vaporization products of said second evaporation into an overhead vapour fraction and a liquid bottom fraction, withdrawing said liquid bottom fraction, and subjecting said overhead fraction to refractionation and recovering a further concentrated liquid hydrogen peroxide fraction therefrom.

6. In a process of purifying and recovering hydrogen peroxide of high concentration from a solution consisting essentially of aqueous hydrogen peroxide and containing relatively non-volatile impurities, the steps which comprise establishing a cyclic flow of an aqueous hydrogen peroxide solution of a predetermined elevated concentration as compared to the dilution of the fresh feed between an evaporating zone and a separating zone both maintained under reduced pressure while controlling the temperature conditions maintained in the evaporation zone so as to insure continuous partial evaporation of the aqueous hydrogen peroxide solution introduced into said evaporating zone and continuous discharge of the evolved vapours and unvaporized liquid to the separating zone, continuously introducing a fresh feed of dilute aqueous hydrogen peroxide containing relatively none-volatile impurities into said cyclic flow in advance of the admission thereof to said evaporating zone and continuously withdrawing as the overhead fraction from said separating zone a flow of vapours of water and hydrogen peroxide at a rate substantially corresponding to the rate of introduction of fresh feed.

7. A process according to claim 6 wherein portions of the bottom product from the separating zone carrying accumulated impurities are periodically withdrawn from the cycle between the point of discharge of said product from the separating zone and the point of reintroduction thereof into said evaporating zone.

8. In a process of purifying and recovering hydrogen peroxide of high concentration from a solution consisting essentially of aqueous hydrogen peroxide and containing relatively non-volatile impurities, the steps which comprise subjecting an aqueous solution of hydrogen peroxide containing relatively non-volatile impurities to distillation under reduced pressure and under temperature conditions insuring partial evaporation of the solution being fed to the distillation vessel, separating the evolved vapours and unvaporized liquid into an overhead fraction containing the larger part of the water vapour and part of the hydrogen peroxide and into a liquid bottom product enriched in hydrogen peroxide and the impurities introduced with the fresh feed, recycling the liquid bottom product to the distillation vessel and commingling therewith fresh feed of the aqueous solution, periodically discharging impurities accumulated in the liquid bottom product, and subjecting the overhead fraction to fractionation under reduced pressure conditions to recover the hydrogen peroxide portion thereof in concentrated form.

9. In a process of purifying and recovering hydrogen peroxide of high concentration from a solution consisting essentially of aqueous hydrogen peroxide and containing relatively non-volatile impurities, the steps which comprise subjecting a dilute aqueous solution of hydrogen peroxide containing relatively non-volatile impurities to distillation in a climbing film evaporator under reduced pressure and temperature conditions insuring partial evaporation of the solution being fed to the evaporator, separating the evolved vapours and unvaporized liquid into an overhead fraction containing the larger part of the water vapour and part of the hydrogen peroxide and into a liquid bottom product enriched in hydrogen peroxide and the impurities introduced with the fresh feed, recycling the bottom product to the evaporator and commingling therewith fresh feed of the dilute aqueous solution, periodically withdrawing portions of the liquid bottom product from the return flow to the evaporator to eliminate impurities accumulated therein, withdrawing the overhead fraction and subjecting the same to fractionation under reduced pressure to recover the hydrogen peroxide content thereof in concentrated and purified form, and controlling the proportion of evolved vapours withdrawn in the overhead fraction so that the rate of the withdrawal thereof substantially corresponds to the rate of introduction of fresh feed of the dilute aqueous solution being introduced to the evaporator.

WILLIAM STANLEY WOOD.
WILLIAM RAYMOND HOLMES.
HENRY WHITTAKER.

REFERENCES CITED

The following references are of record in the file of this patent:

UNITED STATES PATENTS

| Number | Name | Date |
|---|---|---|
| 1,851,961 | Lowenstein | Mar. 29, 1932 |
| 2,224,926 | Potts et al. | Dec. 17, 1940 |
| 2,282,184 | Harrower | May 5, 1942 |
| 2,298,064 | MacMullin | Oct. 6, 1942 |

FOREIGN PATENTS

| Number | Country | Date |
|---|---|---|
| 649,269 | Germany | Aug. 19, 1937 |

OTHER REFERENCES

Maas: "The Properties of Pure Hydrogen Peroxide," 42 Journal of the American Chemical Society, 2548–2570 (pages 2548–2552 relied on) (1920). Copy in Sci. Lib.